(12) United States Patent  
Higurashi

(10) Patent No.: US 10,063,766 B2  
(45) Date of Patent: Aug. 28, 2018

(54) FOCUS DETECTION APPARATUS AND FOCUS DETECTION METHOD WITH A FILTER CIRCUIT FOR FILTERING IMAGE DATA MULTIPLIED BY A COEFFICIENT AFTER BEING RESET

(71) Applicant: Olympus Corporation, Hachioji-shi, Tokyo (JP)

(72) Inventor: Masaki Higurashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/587,981

(22) Filed: May 5, 2017

(65) Prior Publication Data

US 2017/0339331 A1  Nov. 23, 2017

(30) Foreign Application Priority Data

May 20, 2016  (JP) .................................. 2016-101438

(51) Int. Cl.  
*H04N 5/232*  (2006.01)  
*H04N 5/225*  (2006.01)

(52) U.S. Cl.  
CPC ....... *H04N 5/23212* (2013.01); *H04N 5/2254* (2013.01)

(58) Field of Classification Search  
CPC ..... H04N 5/23212; H04N 5/2254; G02B 7/28  
See application file for complete search history.

(56) References Cited

U.S. PATENT DOCUMENTS

| 5,432,552 A * | 7/1995 | Takuma | H04N 5/23212 |
| | | | 348/349 |
| 2013/0335619 A1 * | 12/2013 | Itoh | G03B 13/36 |
| | | | 348/349 |

FOREIGN PATENT DOCUMENTS

| JP | 06-205270 | 7/1994 |
| JP | 5110887 | 10/2012 |

* cited by examiner

*Primary Examiner* — Nicholas G Giles  
(74) *Attorney, Agent, or Firm* — John C. Pokotylo; Pokotylo Patent Services

(57) ABSTRACT

A focus detection apparatus generates a focus evaluation value based on image data corresponding to a predetermined focus detection area. The focus detection apparatus includes a filter circuit, a reset circuit, a multiplication circuit, a coefficient generating circuit, and an integration circuit. The filter circuit filters image data to be input. The reset circuit generates a reset signal to reset the filter circuit. The multiplication circuit multiplies the image data by a predetermined coefficient and supplies the filter circuit with the image data multiplied by the coefficient as image data to be filtered after the reset circuit generates the reset signal. The coefficient generating circuit generates the coefficient. The integration circuit generates the focus evaluation value within the focus detection area based on an output of the filter circuit.

13 Claims, 14 Drawing Sheets

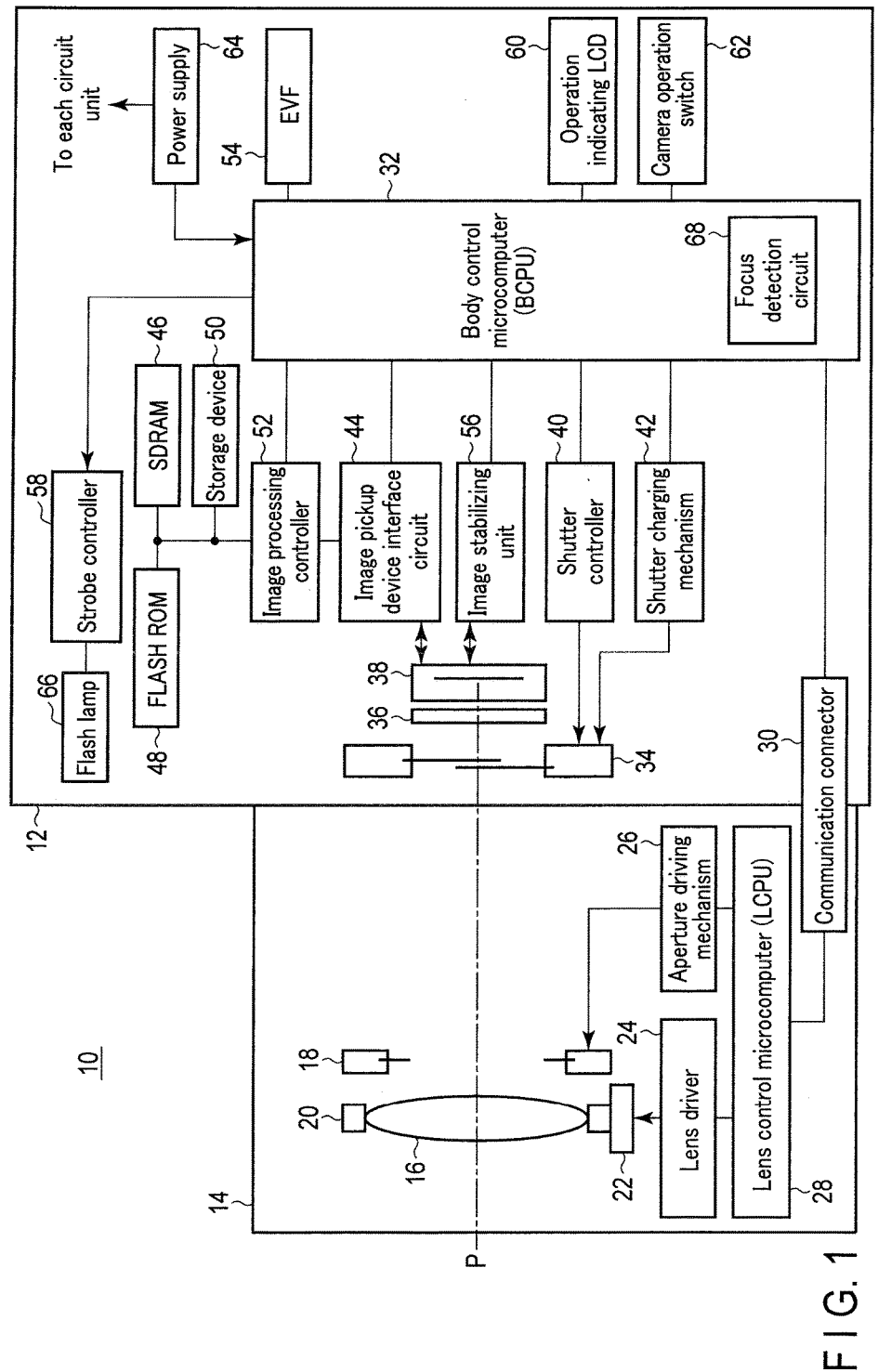
F I G. 1

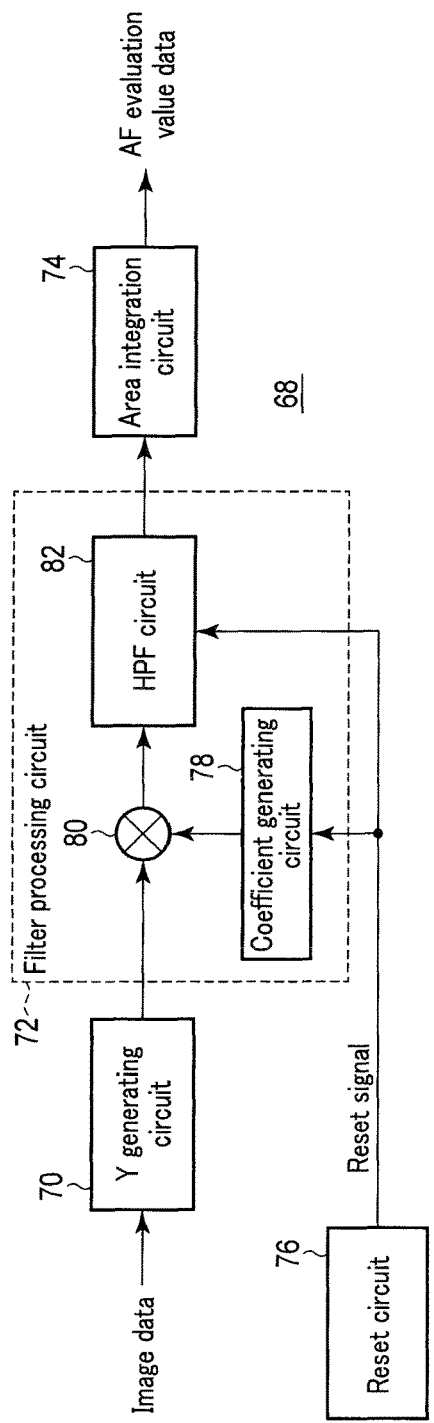
F I G. 2
F I G. 3
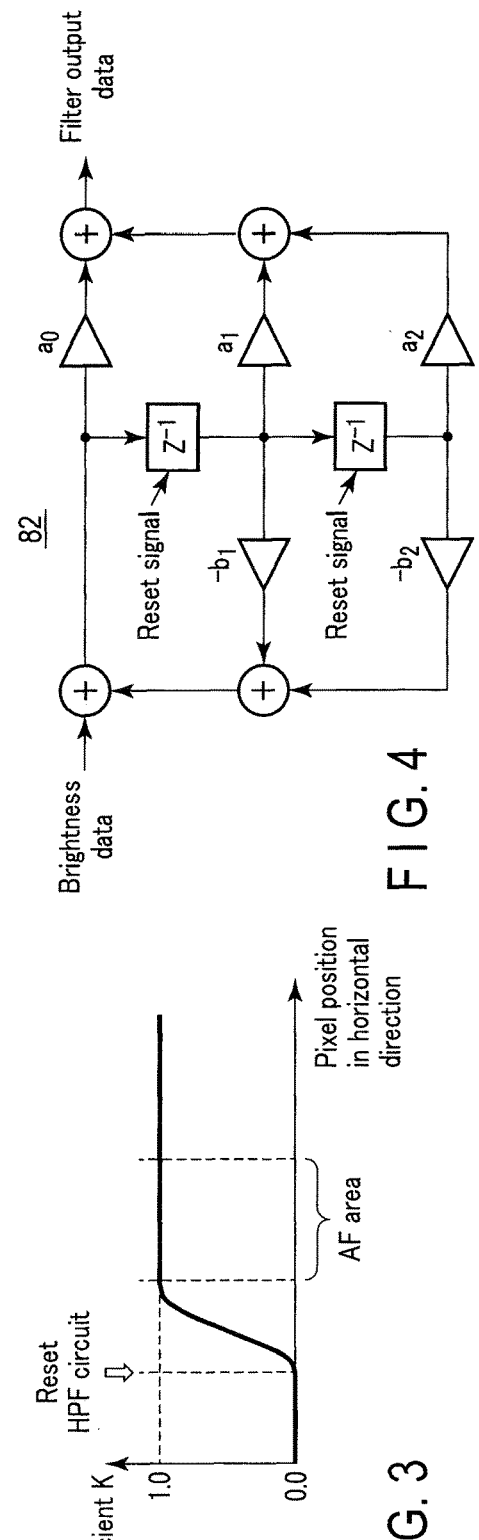
F I G. 4

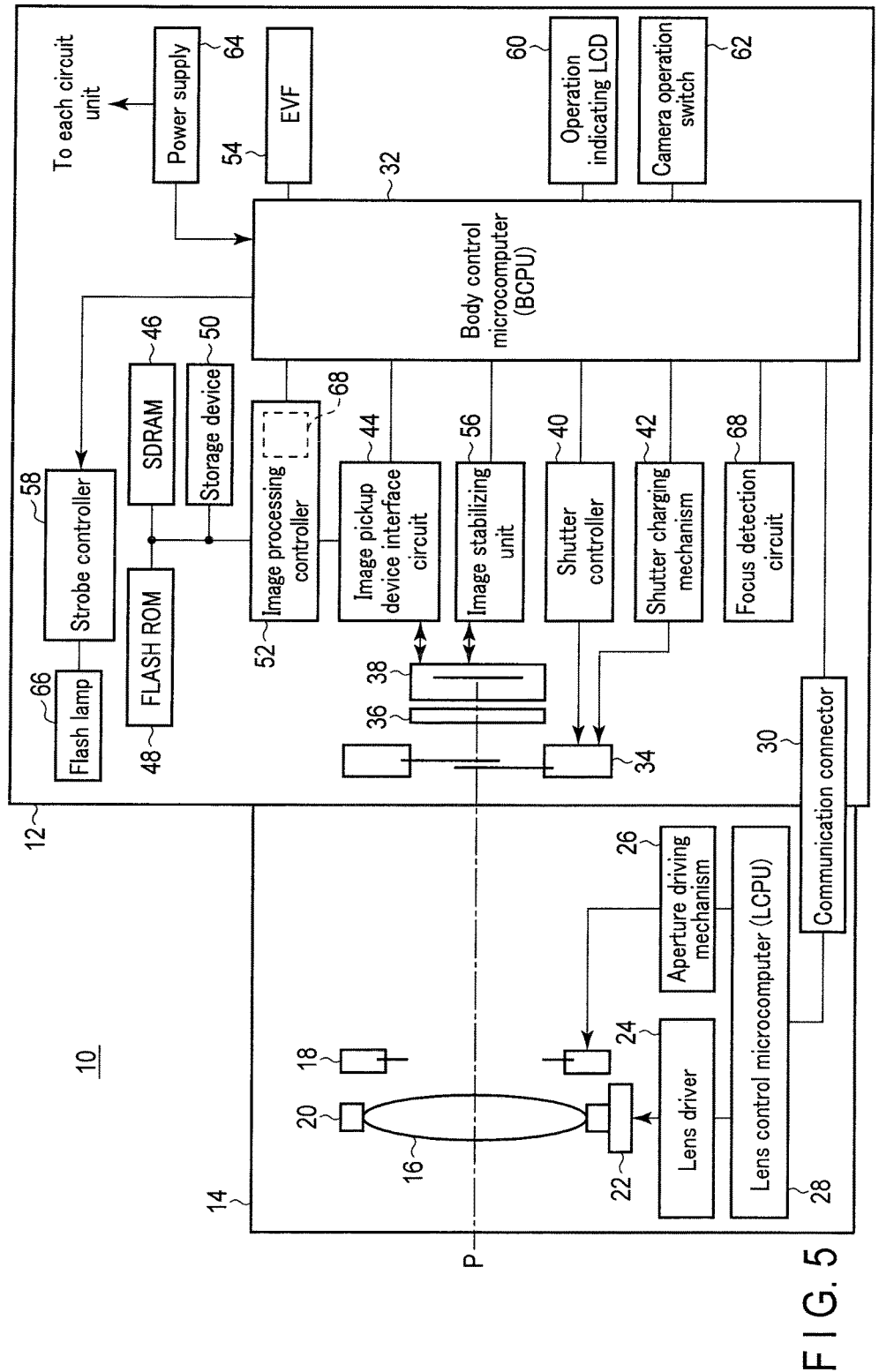
F I G. 5

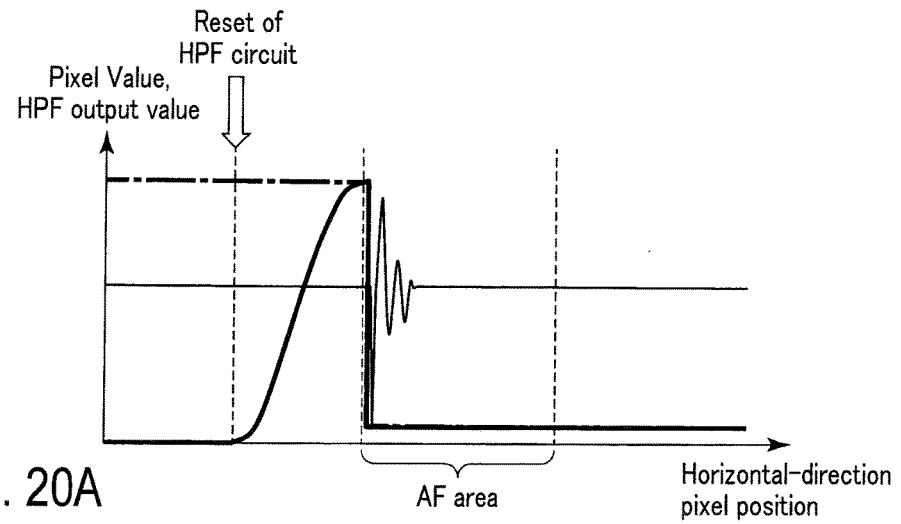
F I G. 20A
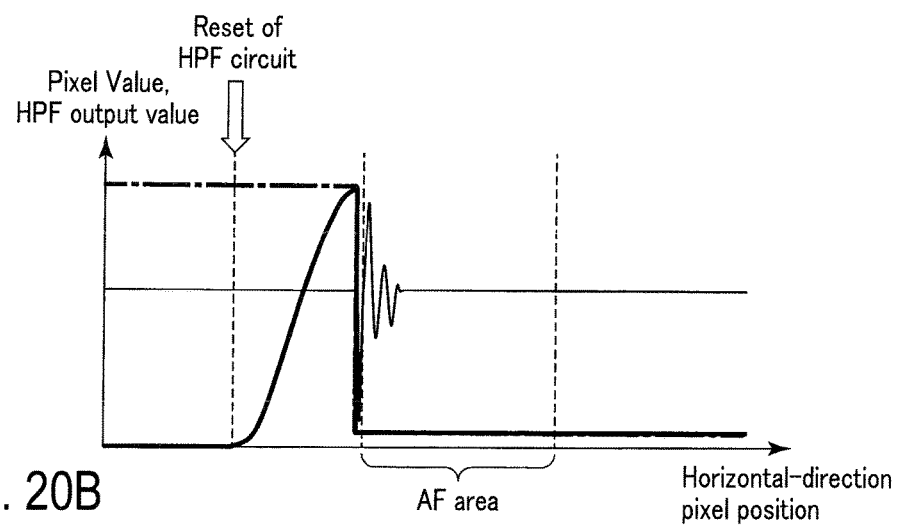
F I G. 20B
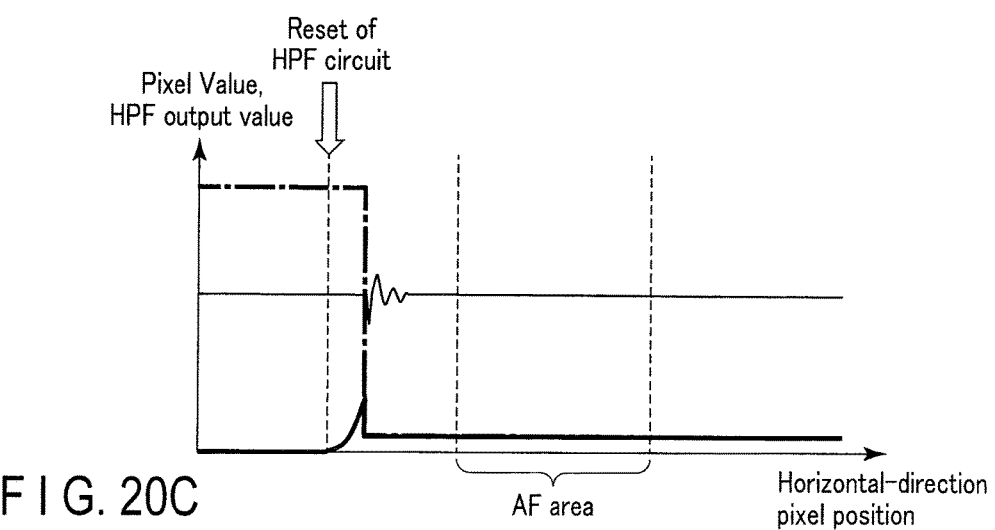
F I G. 20C

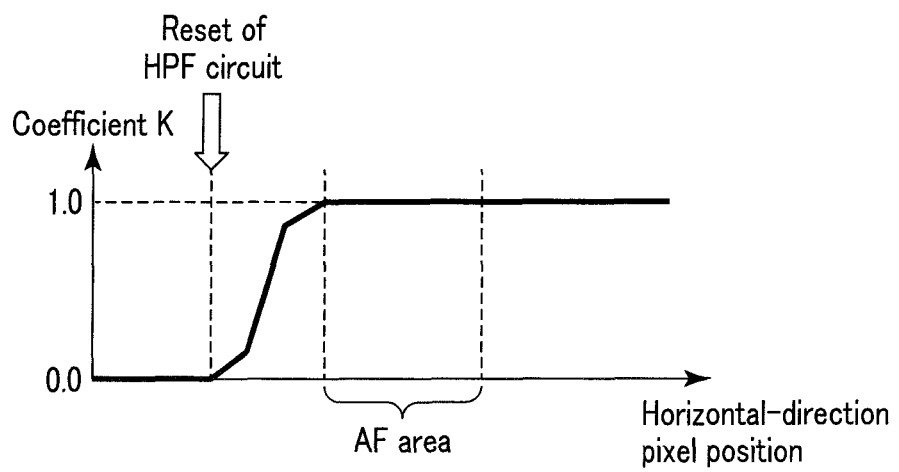
F I G. 24
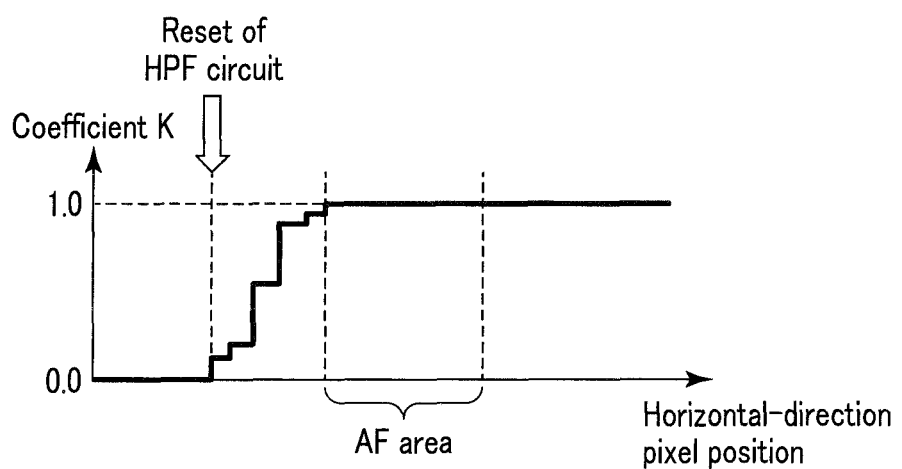
F I G. 25

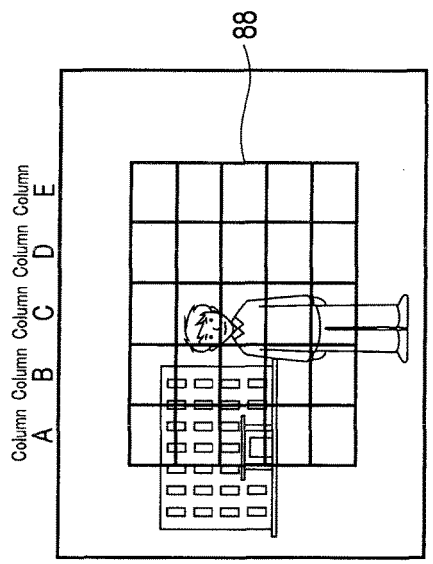
F I G. 26
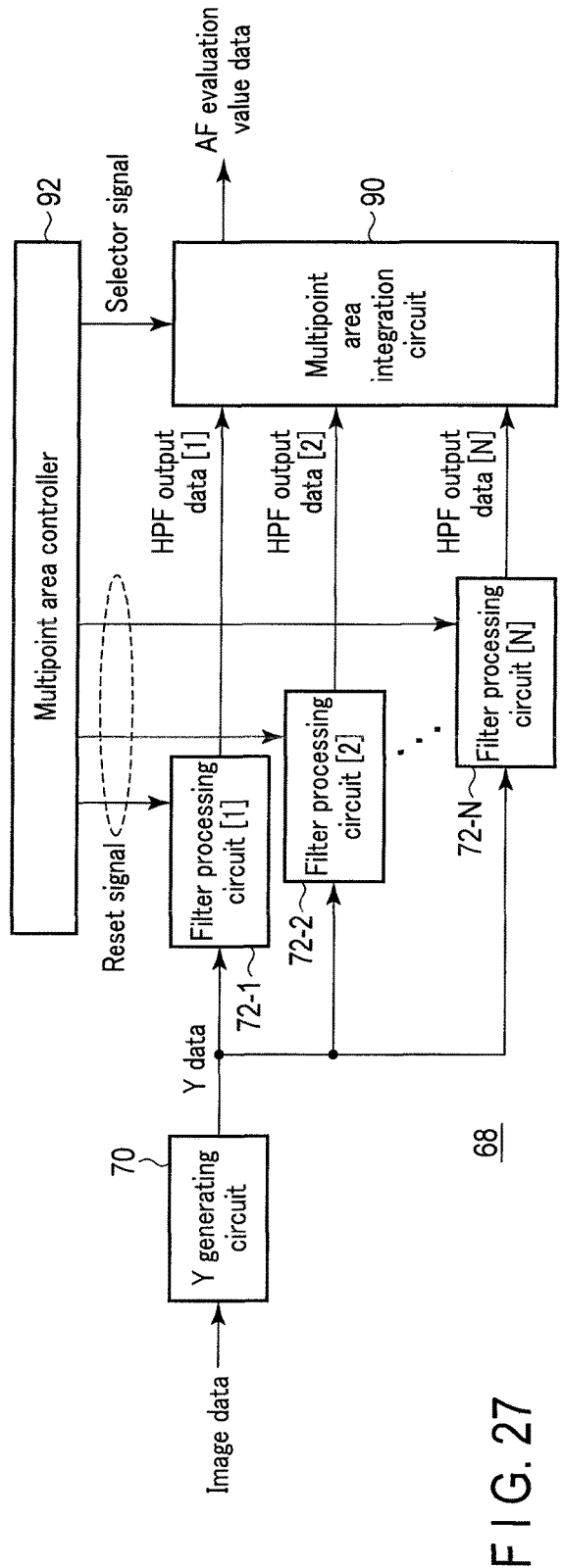
F I G. 27

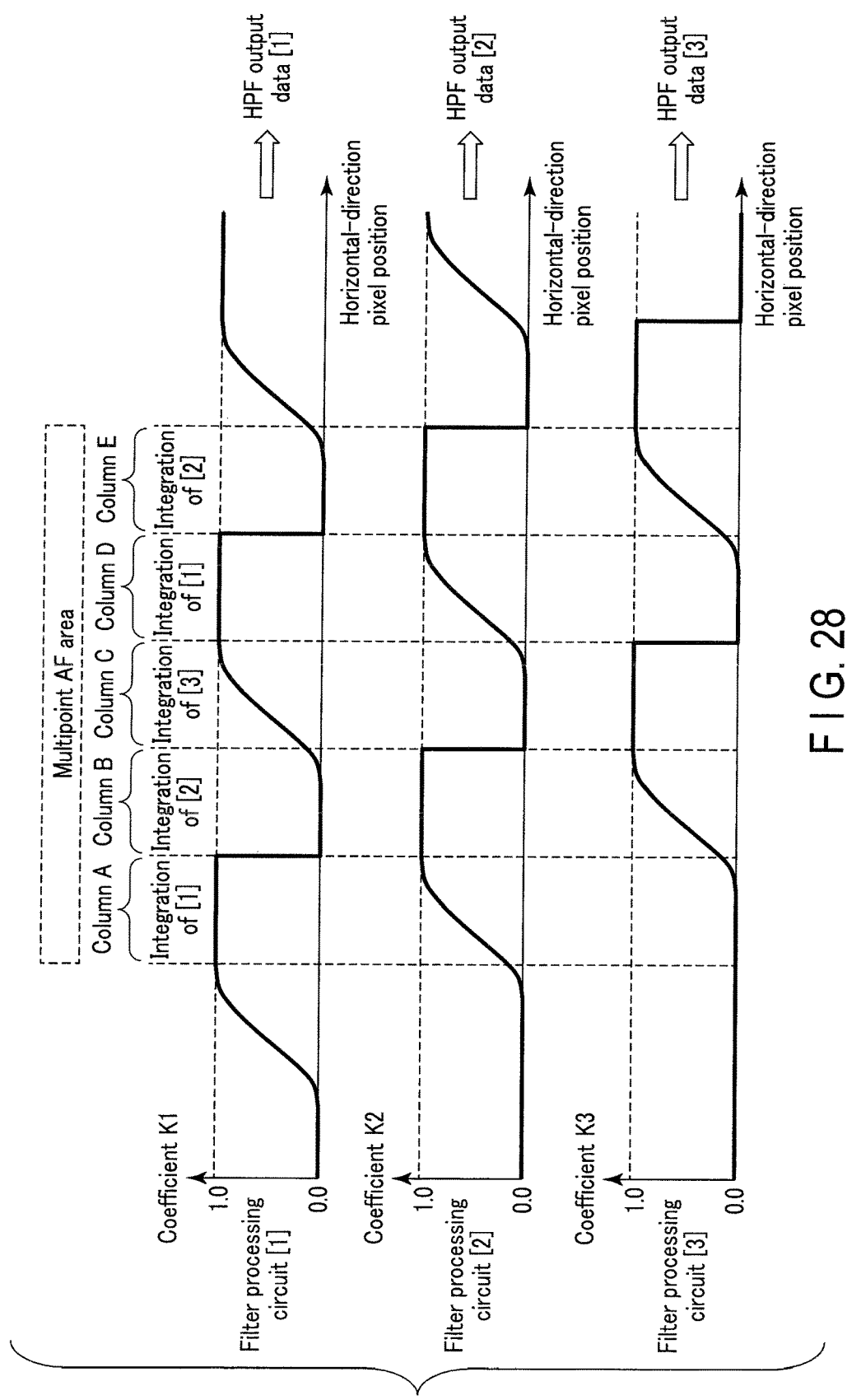
F I G. 28

FOCUS DETECTION APPARATUS AND FOCUS DETECTION METHOD WITH A FILTER CIRCUIT FOR FILTERING IMAGE DATA MULTIPLIED BY A COEFFICIENT AFTER BEING RESET

CROSS-REFERENCE TO RELATED APPLICATION

This application is based upon and claims the benefit of priority from prior Japanese Patent Application No. 2016-101438, filed on May 20, 2016, the entire contents of which are incorporated herein by reference.

BACKGROUND OF THE INVENTION

1. Field of the Invention

The present invention relates to a focus detection apparatus for producing a focus evaluation value based on image data corresponding to a predetermined focus detection area and a focus detection method for doing the same.

2. Description of the Related Art

Optical instruments such as cameras, binoculars and microscopes have an auto-focus (AF) function of adjusting a focus automatically. There are various systems for the AF function. One of the systems is a contrast AF system.

The contrast AF system is as follows. An image is picked up while varying the position of a focus lens to acquire image data. Based on the image data, a contrast value (focus evaluation value) is obtained within a predetermined focus detection area of the picked-up image. The position in which the focus evaluation value is maximized is considered a focusing position. Specifically, in the contrast AF system, an image pickup device picks up an image and outputs image data. The image data is subjected to signal processing such as high-pass filtering and then values within a focus detection area of the picked-up image are integrated into a value. This value is used as a focus evaluation value.

The high pass filter (HPF) used in the contrast AF system is often formed of an infinite impulse response (IIR) filter. In the IIR filter, however, a false signal due to a high-contrast portion outside the focus detection area is superimposed on the focus evaluation value under the influence of an impulse response. This false signal causes false focusing.

Jpn. Pat. Appln. KOKAI Publication No. 6-205270 proposes a method for inhibiting an unnecessary false signal by designating a delay register that is a structural element of an IIR filter to have a specific value. Japanese Patent No. 5110887 proposes a method for inhibiting an influence of signals outside a multipoint area by offsetting a brightness value for the front of the multipoint area.

BRIEF SUMMARY OF THE INVENTION

According to a first aspect of the present invention, there is provided a focus detection apparatus which generates a focus evaluation value based on image data corresponding to a predetermined focus detection area, including a filter circuit which filters image data to be input, a reset circuit which generates a reset signal to reset the filter circuit, a multiplication circuit which multiplies the image data by a predetermined coefficient and supplies the filter circuit with the image data multiplied by the coefficient as image data to be filtered after the reset circuit generates the reset signal, a coefficient generating circuit which generates the coefficient, and an integration circuit which generates the focus evaluation value within the focus detection area based on an output of the filter circuit.

According to a second aspect of the present invention, there is provided a focus detection method of generating a focus evaluation value based on image data corresponding to a predetermined focus detection area, including generating a reset signal to reset a filter circuit which filters image data to be input, generating a predetermined coefficient after the reset signal is generated, multiplying the image data by the coefficient and supplying the filter circuit with the image data multiplied by the coefficient as image data to be filtered after the reset signal is generated, and generating the focus evaluation value within the focus detection area based on an output of the filter circuit.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram of a camera to which a focus detection apparatus according to a first embodiment of the present invention is applied.

FIG. 2 is a functional block diagram of a focus detection circuit serving as the focus detection apparatus according to the first embodiment of the present invention.

FIG. 3 is a chart showing an example of a coefficient generated by a coefficient generating circuit of the focus detection circuit.

FIG. 4 is a diagram showing a configuration of an IIR filter of a Direct Form II type as an example of an HPF circuit of the focus detection circuit.

FIG. 5 is a block diagram showing another configuration of the camera to which the focus detection apparatus is applied.

FIG. 20A is a chart showing one-dimensional image data, image data multiplied by a coefficient and data processed through an HPF in the first embodiment when an edge is within the AF area.

FIG. 20B is a chart showing one-dimensional image data, image data multiplied by a coefficient and data processed through an HPF in the first embodiment when an edge is slightly outside the AF area due to a camera shake.

FIG. 20C is a chart showing one-dimensional image data, image data multiplied by a coefficient and data processed through an HPF in the first embodiment when an edge is originally located at a position distant from the AF area.

FIG. 24 is a chart showing another example of a coefficient generated by the coefficient generating circuit of the focus detection circuit.

FIG. 25 is a chart showing another example of a coefficient generated by the coefficient generating circuit of the focus detection circuit.

FIG. 26 is an illustration of a multipoint AF area in a camera to which a focus detection apparatus according to a second embodiment of the present invention is applied.

FIG. 27 is a functional block diagram showing a focus detection circuit as the focus detection apparatus according to the second embodiment of the present invention.

FIG. 28 is an illustration of an operation of the focus detection circuit of the second embodiment

DETAILED DESCRIPTION OF THE INVENTION

Figure 6:
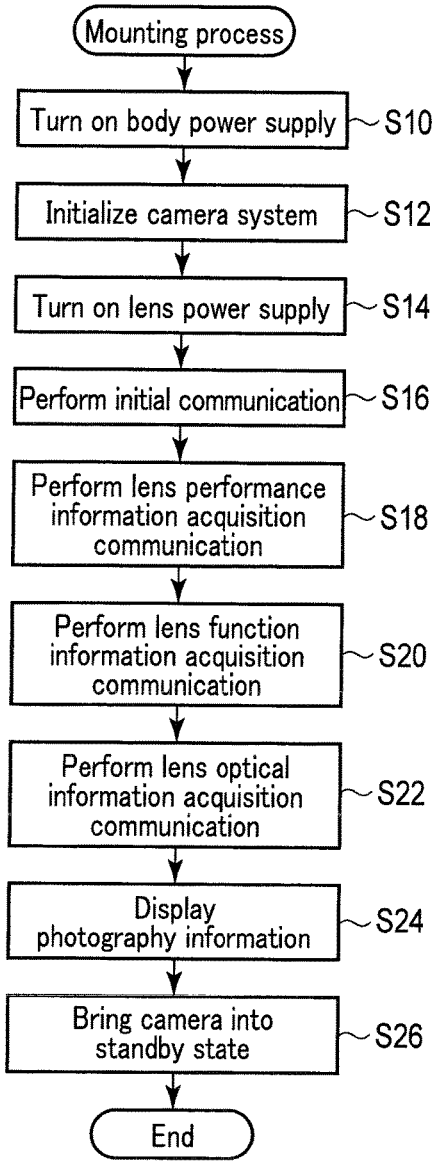
FIG. 6 is a flowchart illustrating a mounting process of the camera shown in FIG. 1.

Embodiments of the present invention will be described below with reference to the accompanying drawings.

First Embodiment

As shown in FIG. 1, a camera 10 to which a focus detection apparatus according to a first embodiment of the present invention is applied includes a body unit 12 and a lens unit (or a lens barrel) 14 that is, for example, replaceable as an accessory device.

The lens unit 14 is detachably mounted on the body unit 12 by means of a lens mount (not shown) provided on the front of the body unit 12. The lens unit 14 includes a taking lens 16 serving as a focus lens, an aperture 18, a lens frame 20, a lens driving mechanism 22, a lens driver 24, an aperture driving mechanism 26 and a lens control microcomputer (LCPU) 28.

The taking lens 16 is supported by the lens frame 20. The lens frame 20 is moved along the direction of an optical axis P by driving a linear motor (not shown) included in the lens driving mechanism 22 and accordingly the taking lens 16 is moved along the direction of the optical axis P. The lens driving mechanism 22 moves the lens frame 20 to move the taking lens 16 along the direction of the optical axis P in response to a control signal supplied from the LCPU 28 via the lens driver 24. The aperture 18 is driven by a stepping motor (not shown) included in the aperture driving mechanism 26.

The LCPU 28 controls driving of the respective parts of the lens unit 14 including the lens driving mechanism 22 and the aperture driving mechanism 26. The LCPU 28 is electrically connected to a body control microcomputer (BCPU) 32 in the body unit 12 through a communication connector 30 and controlled in response to an instruction from the BCPU 32. In other words, the BCPU 32 and LCPU 28 are electrically connected such that they can communicate with each other via the communication connector 30 when the lens unit 14 is mounted on the body unit 12. The LCPU 28 operates while depending on and cooperating with the BCPU 32.

The body unit 12 includes a shutter 34, an optical low pass filter (LPF) 36 and an image pickup device unit 38 on the optical axis P of the taking lens 16 in the lens unit 14. The shutter 34 is a focal-plane shutter. The image pickup device unit 38 photoelectrically converts an object image that has passed through an optical system such as the taking lens 16 in the lens unit 14. The image pickup device unit 38 includes an image pickup device such as a CCD and a CMOS sensor, though it is not shown. Luminous flux passes through the taking lens 16 and its corresponding image is formed on the image pickup surface of the image pickup device in the image pickup device unit 38 through the shutter 34 and optical LPF 36.

The optical LPF 36 is provided between the image pickup device unit 38 and the shutter 34. The shutter 34 is disposed in front of the optical LPF 36. The body unit 12 also includes a shutter controller 40 and a shutter charging mechanism 42. The shutter controller 40 controls movement of the front curtain (not shown) and rear curtain (not shown) of the shutter 34. The shutter charging mechanism 42 charges a spring to drive the front and rear curtains.

The body unit 12 also includes an image pickup device interface circuit 44, an SDRA 46, a flash ROM (FLASH ROM) 48, a storage device 50 and an image processing controller 52. The image pickup device interface circuit 44 is connected to the image pickup device in the image pickup device unit 38. The SDRA 46 and flash ROM 48 are each provided as a storage area. The image processing controller 52 performs image processing. The image pickup device interface circuit 44, SDRA 46, flash ROM 48 and storage device 50 are connected to the image processing controller 52. These are configured to fulfil the electronic image pickup functions.

The storage device 50 is an external storage medium such as various types of memory card or external had disk drive (HDD). The storage device 50 is communicably and replaceably mounted on the body unit 12 of the camera 10.

The communication connector 30, shutter controller 40, shutter charging mechanism 42, image processing controller 52 and electronic view finder (EVF) 54 are connected to the BCPU 32.

In response to an instruction from the BCPU 32, the image processing controller 52 controls the image pickup device interface circuit 44 to capture image data from the image pickup device unit 38. The image processing controller 52 converts the image data into data for display and displays it on the EVF 54 through the BCPU 32. A photographer can confirm the photographed image from the image data displayed on the EVF 54.

The SDRAM 46 is a temporary storing memory and is used in, e.g. a work area to convert image data. This image data is subjected to various types of image processing and converted into JPEG data by means of the image processing controller 52. Then, the JPEG data is stored in the storage device 50.

An image stabilizing unit 56, a strobe controller 58, an operation indicating LCD 60, a camera operation switch (SW) 62 and a power supply 64 are connected to the BCPU 32.

In response to an instruction from the BCPU 32, the image stabilizing unit 56 moves the image pickup device unit 38 in a predetermined direction to correct a camera shake.

In response to an instruction from the BCPU 32, the strobe controller 58 causes a flash lamp 66 to emit a flash of light.

The operation indicating LCD 60 makes a display to notify a photographer of an operating status of the device. In other words, the operation indicating LCD 60 notifies the operating status of the device to the photographer in a display output form.

The camera operation SW 62 is formed of a group of switches including an operation button necessary to operate the camera 10. The switches include, for example, a release switch to give an instruction to perform a picture taking operation, a mode selection switch to select between a picture taking mode and an image display mode, and a power switch, none of which is shown. The release switch includes a first release switch (1RSW) to perform a half-press operation and a second release switch (2RSW) to perform a full-press operation.

The power supply 64 is provided to convert a power supply voltage (not shown) into a voltage and supply the voltage to the circuit units of the camera 10 as required.

The BCPU 32 is configured to serve as a focus detection circuit 68 corresponding to the focus detection apparatus according to the first embodiment.

The focus detection circuit 68 includes a brightness signal (Y) generating circuit 70, a filter processing circuit 72, an area integration circuit 74 and a reset circuit 76, as shown in FIG. 2. The Y generating circuit 70 generates brightness data by extracting only the brightness component from image data supplied from the image processing controller 52. The filter processing circuit 72 performs a given filtering process, e.g. a high-pass filtering process for the brightness data generated by the Y generating circuit 70. The area integration circuit 74 integrates the absolute values of data processed by the filter processing circuit 72 within a predetermined focus detection area (referred to as AF area hereinafter) of a photographed image to obtain AF evaluation value data. The reset circuit 76 generates a reset signal to reset the filter processing circuit 72.

The filter processing circuit 72 includes a coefficient generating circuit 78, a multiplier 80 and a high pass filter (HPF) circuit 82. The coefficient generating circuit 78 generates a predetermined coefficient. This predetermined coefficient includes a coefficient that increases gradually from the input of image data (brightness data) obtained when the reset circuit 76 generates a reset signal to the input of brightness data corresponding to the AF area, as shown in FIG. 3, for example. In this embodiment, the coefficient increases gradually from 0 to 1, or it increases gradually to 100%. The multiplier 80 multiplies the brightness data generated by the Y generating circuit 70 by the coefficient generated by the coefficient generating circuit 78. The HPF circuit 82 performs a high-pass filtering process for the brightness data multiplied by the coefficient by the multiplier 80. The HPF circuit 82 can be formed of an IIR filter of a Direct Form II type, as shown in FIG. 4, for example. The HPF circuit 82 can be formed differently from that shown in FIG. 4. Furthermore, the HPF circuit 82 can be replaced with a band pass filter (BPF) formed of a cascade IIR filter.

An example where the focus detection circuit 68 is achieved as a function of the BCPU 32 has been described so far. However, the circuit shown in FIG. 2 can be configured as hardware (H/W) and connected to the BCPU 32 as shown in FIG. 5. Or if the focus detection circuit 68 is incorporated into the image processing controller 52 that is called an image engine, as indicated by the broken line in FIG. 5, instead of configuring the focus detection circuit 68 as an independent H/W circuit, the number of parts in the camera 10 can be reduced.

There is a case where autofocusing is performed using, e.g. color data (R, G and B data) as well as the brightness data. In this case, R, G and B data before YCbCr processing or color-difference data Cb and Cr after YCbCr processing can be input to the filter processing circuit 72 in place of the Y generating circuit 70.

An operation of the focus detection circuit 68 will be described in detail later.

The BCPU 32 determines a lens position in which the taking lens 16 is in focus, based on the AF evaluation value data generated by the focus detection circuit 68.

In the camera 10 configured as described above, an object can be observed in what is called a live view mode. In the live view mode, for example, images of 60 frames per second are continuously captured and displayed. It is thus possible to obviate the need for a finder optical system that has conventionally been used in a single-lens reflex camera. To display a live view image, the shutter 34 is opened, and luminous flux emitted from the taking lens 16 is guided to the image pickup device unit 38. The image pickup device unit 38 generates image data. In response to an instruction from the BCPU 32, the image processing controller 52 controls the image pickup device interface circuit 44 to capture the image data from the image pickup device unit 38. The captured image data is stored in the SDRAM 46 that is a temporary storage memory. The image data stored in the SDRAM 46 is converted into display data by the image processing controller 52 and then output and displayed on the EVF 54 through the BCPU 32. Thus, a photographer can confirm the above live view image to confirm the photographed image from the image displayed on the EVF 54.

The focusing of the taking lens 16 is performed as follows. An image is picked up while varying the position of the taking lens 16 to generate AF evaluation value data from the focus detection circuit 68 of the BCPU 32. Based on the AF evaluation value data, the BCPU 32 computes a lens position of the highest contrast of the picked-up image. The BCPU 32 transmits the computed lens position of the highest contrast of the picked-up image to the LCPU 28 of the lens unit 14 through the communication connector 30. The LCPU 28 controls the taking lens 16 to be set in the lens position.

The BCPU 32 has a function of detecting a light intensity from image data captured by the image processing controller 52 and performing a well-known light metering process based on the detected light intensity.

When a still image is picked up, the shutter control circuit 40 receives a signal to drive the shutter 34 from the BCPU 32 and controls the shutter 34 based on the signal. Concurrently with this, the shutter control circuit 40 supplies the BCPU 32 with a strobe synchronization signal to cause the flash lamp 66 to emit a flash of light with prescribed timing. The BCPU 32 supplies a flash instruction signal to the strobe controller 58 based on the strobe synchronization signal when the need arises.

As described above, the image processing controller 52 captures image data into the SDRAM 46 from the image pickup device unit 38 in response to an instruction from the BCPU 32. After that, the image processing controller 52 performs various types of image processing for the image data captured into the SDRAM 46 and then converts it into JPEG data and stored in the storage device 50. When the image data is a moving image, the image processing controller 52 converts it into MPEG data and stores the MPEG data in the storage device 50.

When a photographer operates the mode selection switch in the camera operation SW 62 to switch the picture taking mode to the image display mode, the image data can be read out of the storage device 50 and displayed on the EVF 54. In other words, the image data read out of the storage device 50 is converted into display data by the image processing controller 52 and then output and displayed on the EVF 54 through the BCPU 32.

An operation of the camera 10 configured as described above will be described in detail below.

First, an operation of mounting the camera 10 will be described with reference to the flowchart shown in FIG. 6. This mounting operation is controlled chiefly by the BCPU 32.

When a photographer operates the power switch of the camera operation SW 62 to turn on a body power supply (step S10), the BCPU 32 performs a given camera system initialization operation (step S12). The BCPU 32 turns on a lens power supply to supply power to the lens unit 14 from the power supply 64 (step S14), and performs initial communication with the LCPU 28 through the communication connector 30 (step S16). The BCPU 32 performs lens performance information acquisition communication with the LCPU 28 to acquire lens performance information such as an F-number and focal length (step S18). The BCPU 32 also performs lens function information acquisition communication with the LCPU 28 to acquire lens function information such as communication speed and lens driving speed (step S20). The BCPU 32 also perform lens optical information acquisition communication with the LCPU 28 to acquire lens optical information such as distortion (step S22). These lens performance information acquisition, lens function information acquisition and lens optical information acquisition communications need not always be performed in the order presented here. If all the information items can be acquired, the communications can be performed in whatever order. After that, the BCPU 32 displays photography information on the EVF 54 based on the acquired information (step S24), and the camera 10 is brought into a standby state (step S26).

An operation of a photography sequence of the camera 10 performed in the standby state will be described with reference to the flowchart shown in FIG. 7. The photography sequence operation is controlled chiefly by the BCPU 32.

First, the BCPU 32 communicates with the LCPU 28 of the lens unit 14 through the communication connector 30 to acquire a lens state of the taking lens 16, such as the current zoom state and lens position (step S30). The BCPU 32 can determine a distortion coefficient based on the acquired lens state and the lens optical information acquired in step S22 to allow the image processing controller 52 to correct distortions for a live view image displayed on the EVF 54 and an image recorded on the storage device 50.

After that, the BCPU 32 determines whether a photographer has pressed the release switch in the camera operation SW 62 halfway down, or whether he or she has turned on the first release switch (1RSW) (step S32). When the BCPU 32 determines that the release switch was not pressed halfway down, it returns the process to step S30. Accordingly, the lens state acquisition communication is carried out regularly (e.g. for each imaging frame rate).

When the BCPU 32 determines that the release switch has been pressed halfway down, it performs an operation of a contrast AF subroutine (step S34).

Figure 8:
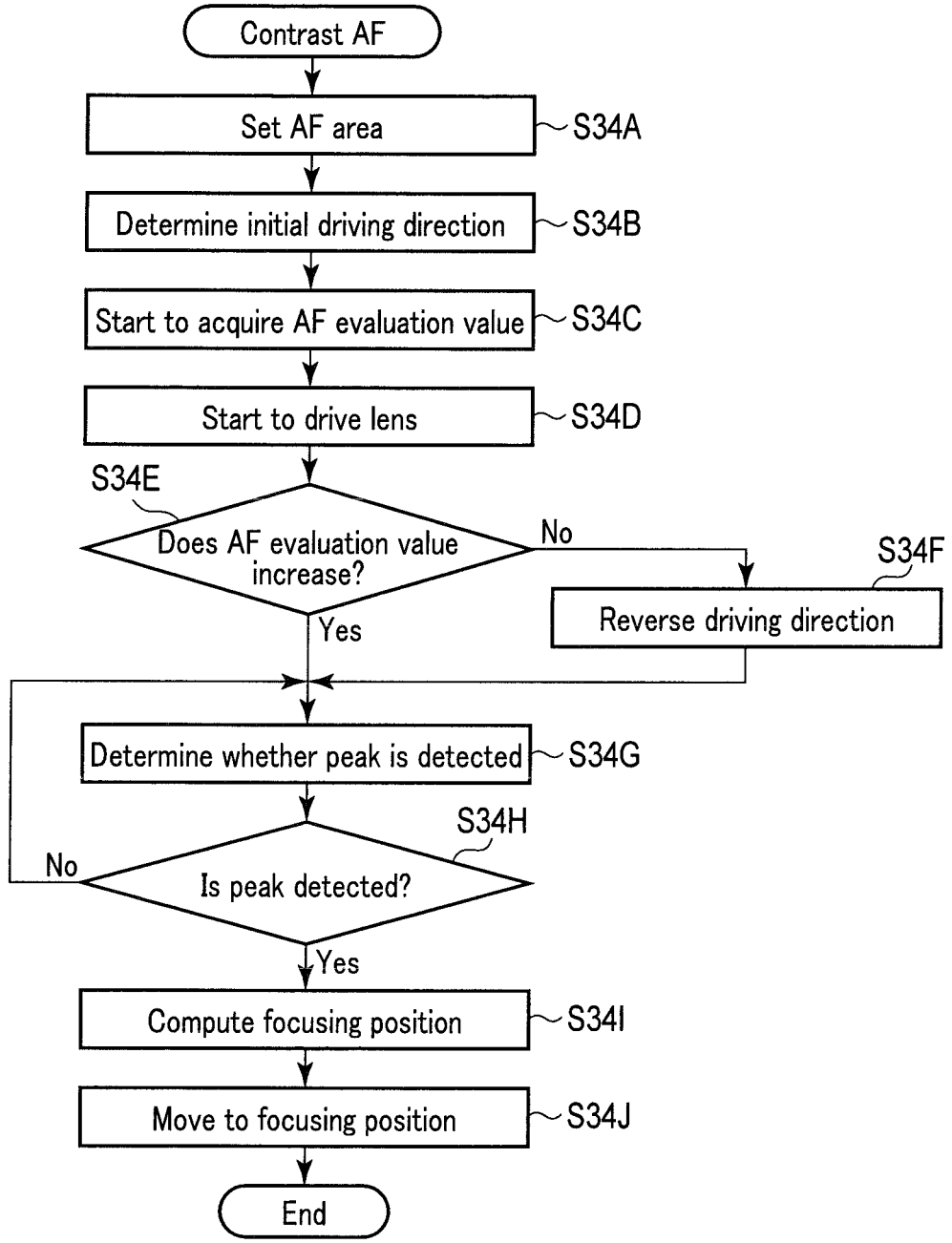
FIG. 8 is a flowchart illustrating an operation of a contrast AF subroutine in FIG. 7.

In the contrast AF subroutine, as shown in FIG. 8, the BCPU 32 first sets an AF area (step S34A). Then, the BCPU 32 determines an initial driving direction of the taking lens 16 (step S34B). This determination is a process of determining whether to drive the taking lens 16 in an infinite (∞) direction or a close-range direction. For example, when the current position of the taking lens 16 acquired in step S30 is close to the infinite (∞) side, the BCPU 32 determines that the taking lens 16 is driven in the close-range direction.

The BCPU 32 starts to acquire AF evaluation value data from the focus detection circuit 68 (step S34C) and starts to drive the taking lens 16 (step S34D). The taking lens 16 is driven and controlled based on a control command transmitted from the BCPU 32 to the LCPU 28 through the communication connector 30.

The BCPU 32 determines whether an AF evaluation value (contrast value) data acquired from the focus detection circuit 68 increases or not to make a direction determination (step S34E). When the BCPU 32 determines that the AF evaluation value data increases, it advances the process to step S34G. When the BCPU 32 determines in step S34E that the AF evaluation value data decreases, it reverses the driving direction of the taking lens 16 (step S34F). After that, the BCPU 32 advances the process to step S34G.

Figure 9:
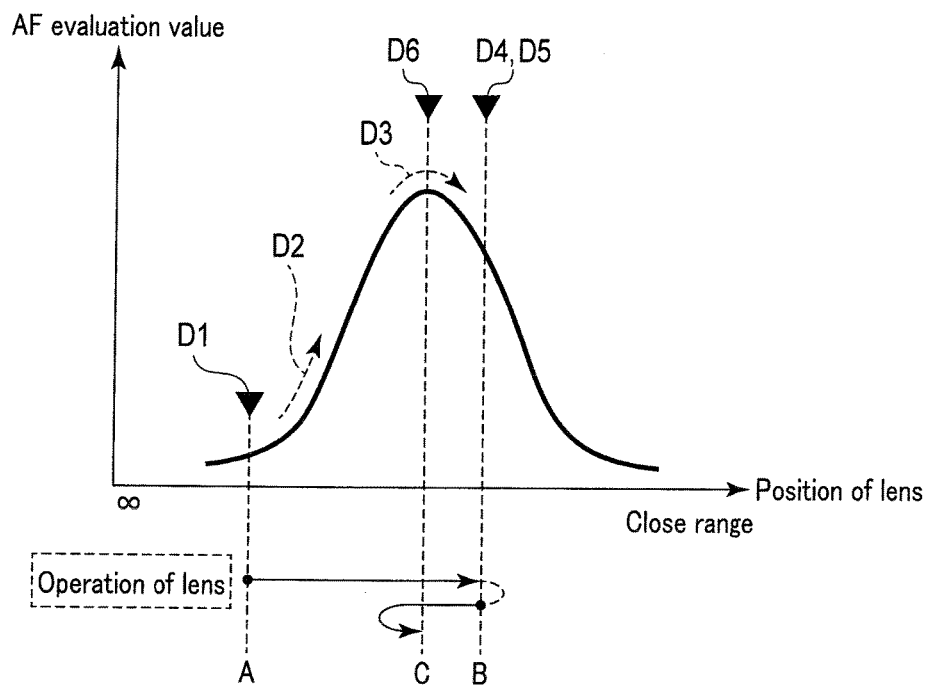
FIG. 9 is a chart of a contrast curve showing the relationship between AF evaluation value data and the position of a taking lens.

FIG. 9 is a chart of a contrast curve showing the relationship between the AF evaluation value data and the position of the taking lens 16. As described above, the AF evaluation value data is synonymous with the contrast value and is a numerical value representing how much an image is blurred. To obtain the AF evaluation value data, generally, image data is filtered through an HPF and a BPF and its results are accumulated.

Assume that the initial position of the taking lens 16 is located at point A on the infinite (∞) side and the focusing position is located at point C that is closer to the close-range side than point A, as shown in FIG. 9. When the BCPU 32 starts to acquire AF evaluation value data (D1 in FIG. 9), it determines whether the taking lens 16 is driven toward the focusing position, based on the increase or decrease of the AF evaluation value data (D2 in FIG. 9).

Since the taking lens 16 is driven toward the close-range side from the infinite (∞) side in the example of FIG. 9, the driving is continued. When the taking lens 16 is driven toward the infinite (∞) side from point A in FIG. 9, the BCPU 32 determines in step S34E that the AF evaluation value data decreases and thus reverses the driving direction of the taking lens 16. In other words, the BCPU 32 reverses the driving direction of the taking lens 16 from the infinite (∞) side to the close-range side.

The BCPU 32 makes a peak determination (D3 in FIG. 9) (step S34G) to determine whether a peak is detected or not (step S34H). When the BCPU 32 determines that no peak is detected, it returns the process to step S34G and repeats this operation until a peak is detected.

When the BCPU 32 determines that a peak is detected (D4 in FIG. 9), it computes a focusing position (D5 in FIG. 9) (step S34I). Then, the BCPU 32 moves the taking lens 16 to the focusing position computed in step S34I (D6 in FIG. 9) (step S34J).

The BCPU 32 moves the taking lens 16 to the focusing position in step S34J. More specifically, the BCPU 32 moves the taking lens 16 toward the close-range side from point A to start to acquire AF evaluation value data (D1) as shown in the lower part of FIG. 9, and computes a focusing position (D5) when a peak is detected (D4). Concurrently with this, the BCPU 32 reverses the driving direction of the taking lens 16 to move the taking lens 16 toward the infinite (∞) side from point B. Once the taking lens 16 passes the position of the peak, the BCPU 32 reverses the driving direction again to move the taking lens 16 toward point C corresponding to the focusing position. This operation is intended to eliminate the influence of a backlash in the lens driving mechanism 22 and the like and stop the taking lens 16 correctly in optically the same position as the position of the taking lens 16 that has passed the peak of the AF evaluation value data. Thus, the taking lens 16 reaches point C corresponding to the focusing position.

In step S34I, the BCPU 32 may seek reliability of the focusing position computed by variations in the acquired AF evaluation value data and determine the taking lens as an unfocused one when the reliability is low, without executing step S34J. The BCPU 32 sets a focusing flag to "1" when it determines that the taking lens is focused and sets the focusing flag to "0" when it determines that the lens is unfocused.

Figure 7:
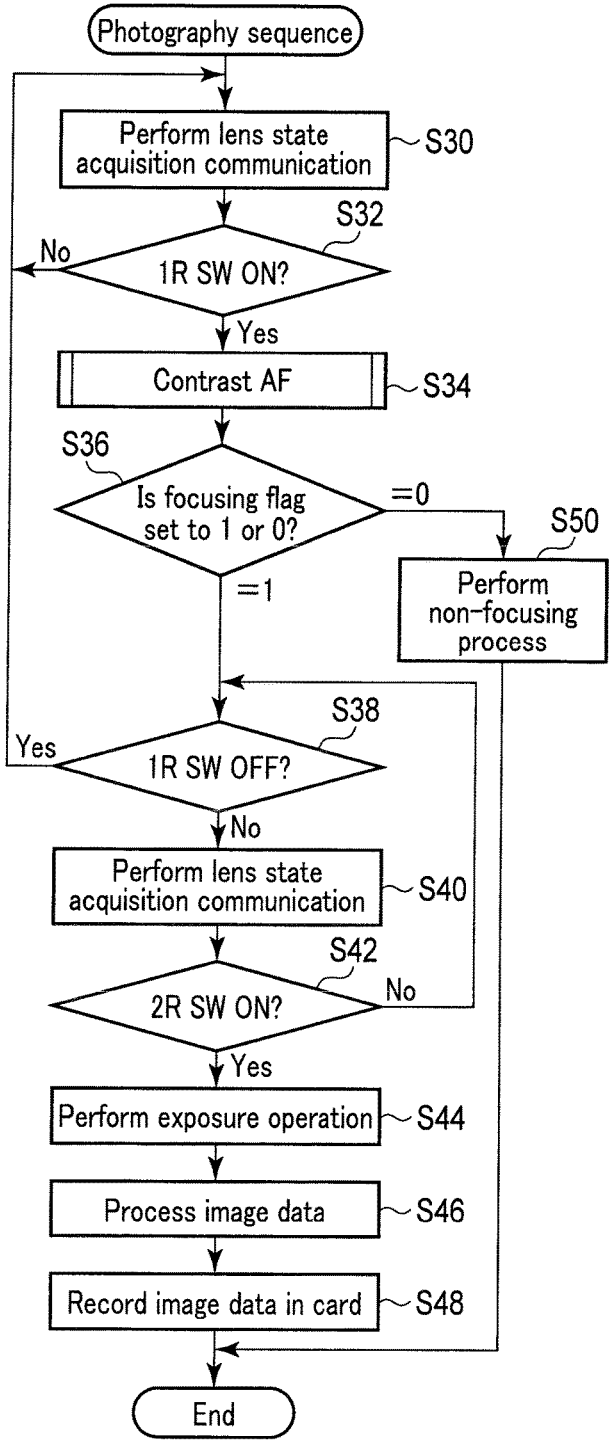
FIG. 7 is a flowchart illustrating an operation of a photography sequence of the camera shown in FIG. 1.

Returning to the flowchart shown in FIG. 7, the BCPU 32 determines a state of the focusing flag (step S36). If the BCPU 32 determines that the focusing flag is set to "1," or it determines that the taking lens is in a focused state, it determines again whether the half-press operation of the release switch in the camera operation SW 62 is released, or it determines whether the 1RSW is turned off (step S38). If the BCPU 32 determines that the halfway-press operation of the release switch is released, or if a photographer completes pressing the release switch halfway down without pressing it all the way down, the BCPU 32 returns the process to step S30 and brings the 1RSW into a standby state.

If the BCPU 32 determines that the release switch continues its halfway-press operation, it communicates with the LCPU 28 of the lens unit 14 through the communication connector 30 to acquire a lens state of the taking lens 16, such as the current zoom state and lens position (step S40). After that, the BCPU 32 determines whether the release switch is pressed all the way down, or whether the second release switch (2RSW) is operated (step S42). If the BCPU 32 determines that the release switch is not pressed all the way down, it returns the process to step S38.

If the BCPU 32 determines in step S42 that the release switch is pressed all the way down, it performs an exposure operation (step S44). The BCPU 32 causes the image processing controller 52 to perform various types of processing for image data sent from the image pickup device unit 38 (step S46) and then records the processed image data in the storage device 50 (step S48). If image data recording is so completed, the BCPU 32 completes the operation of the photography sequence.

If the BCPU 32 determines in step S36 that the focusing flag is set to "0" and the taking lens is not focused, it performs a non-focusing process (step S50). Then, the BCPU 32 completes the operation of the photography sequence.

Though the photography sequence is completed here, the process may be returned to step S30 for the next photography.

The camera 10 is operated as described above. The focus detection circuit 68 corresponding to the focus detection apparatus according to the first embodiment, which is applied to the camera 10, detects a focus using a contrast AF system.

In the contrast AF system, when there is a high-contrast object around an AF area, if the HPF circuit 82 of the focus detection circuit 68 is formed of an IIR filter, a false peak is produced on the contrast curve under the influence of an impulse response.

Figure 10:
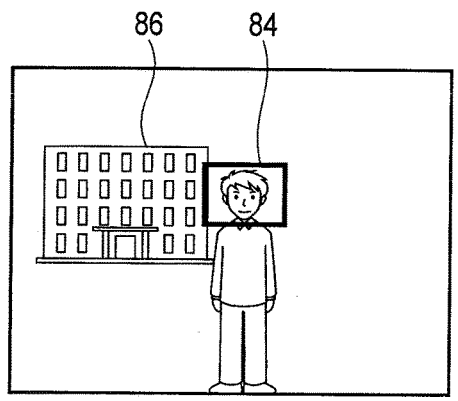
FIG. 10 is an illustration of an example of a photographing scene in which a false peak may be produced on a contrast curve.
Figure 11:
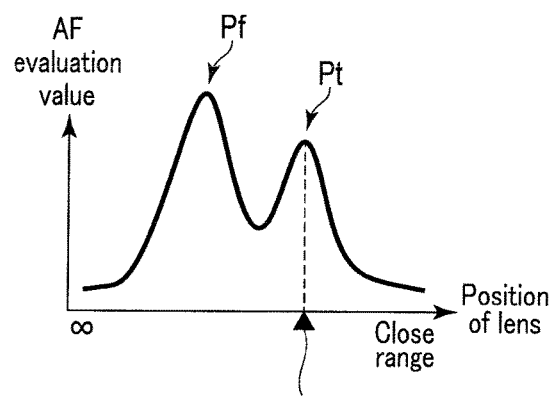
FIG. 11 is a chart showing a contrast curve in the photographing scene of FIG. 10.
Figure 12:
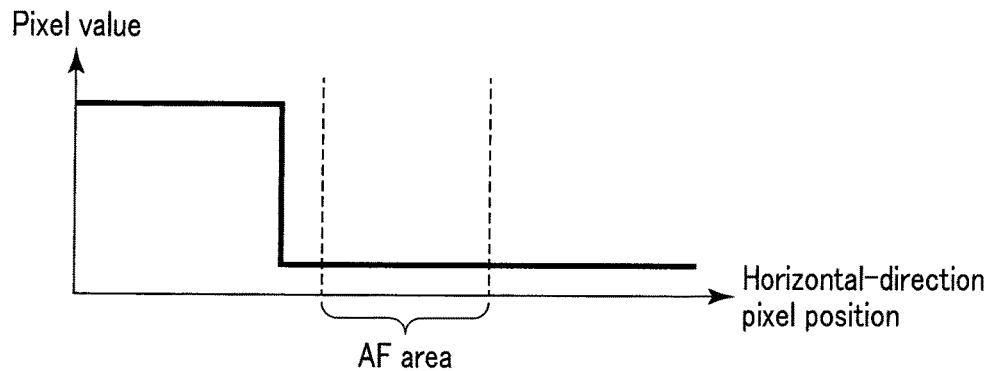
FIG. 12 is a chart showing one-dimensional image data as a relationship between a pixel value and a horizontal-direction pixel position.
Figure 13:
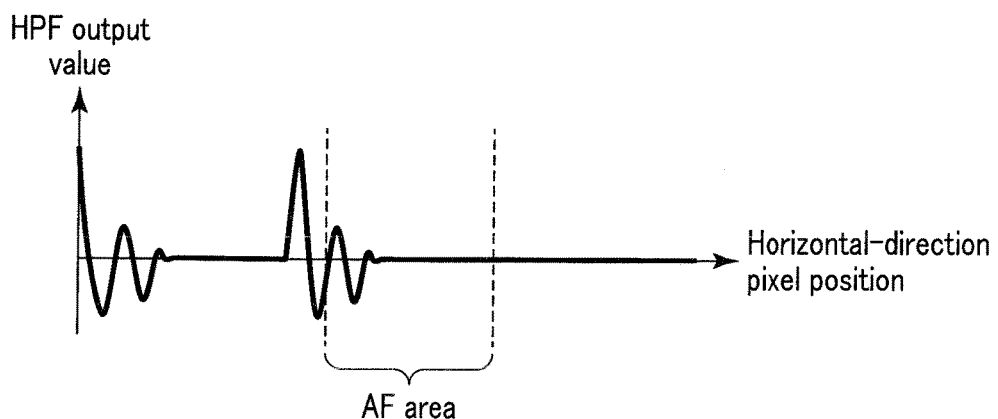
FIG. 13 is a chart showing data obtained by filtering the one-dimensional image data of FIG. 12 through an HPF, as a relationship between an HPF output value and a horizontal-direction pixel position.
Figure 14:
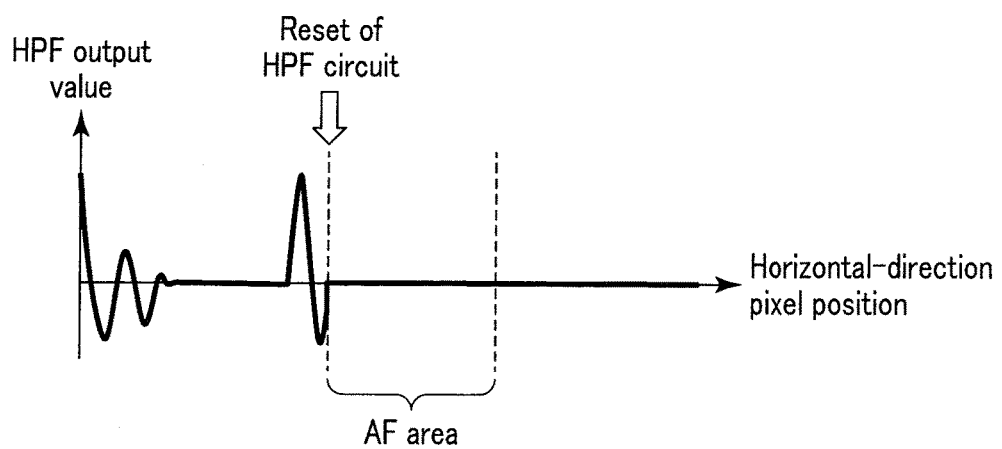
FIG. 14 is a chart showing data processed through an HPF as a relationship between an HPF output value and a horizontal-direction pixel position when the HPF circuit is reset on the boundary of an AF area.

Assume that a picture of a person is taken against the background of a construction, such as a building, as shown in FIG. 10. In FIG. 10, an AF area 84 is directed to the person to set a composition of the picture such that the construction of a high-contrast object 86 as the background is located outside the AF area 84. Even though this composition is set, the use of an IIR filter in the HPF circuit 82 will cause a false peak Pf due to the construction in a lens position other than that of a peak Pt due to the person, as indicated by the contrast curve in FIG. 11. For the sake of brevity, consider one-dimensional image data and a situation in which there is an edge outside the AF area 84 and there is no object within the area, as shown in FIG. 12. As HPF-processed data, false signals from the edge enter the AF area 84, as shown in FIG. 13. The false signals are integrated by the area integration circuit 74 to cause the false peak Pf on the contrast curve, which will be determined as a focusing position.

The above problem can be resolved by supplying a reset signal to the HPF circuit 82 from the reset circuit 76 on the boundary of the AF area 84 and resetting the HPF circuit 82. Upon receipt of a reset signal, the HPF circuit 82 sets a value of a delay register shown in FIG. 4 to an appropriate value corresponding to coefficients (a1, b1, etc.) and input brightness data. The false signals can thus be inhibited.

Figure 15:
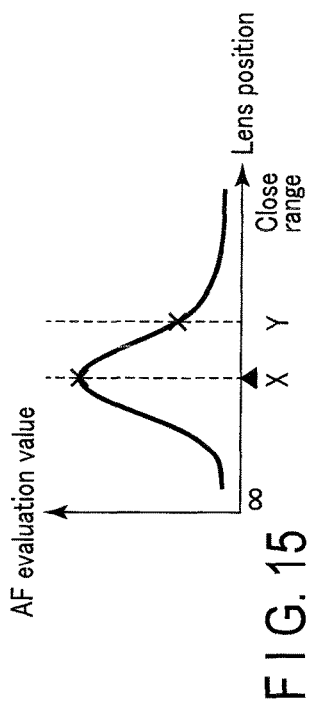
FIG. 15 is a chart showing a contrast curve when there is an edge in the AF area and near the boundary of the AF area.
Figure 17A:
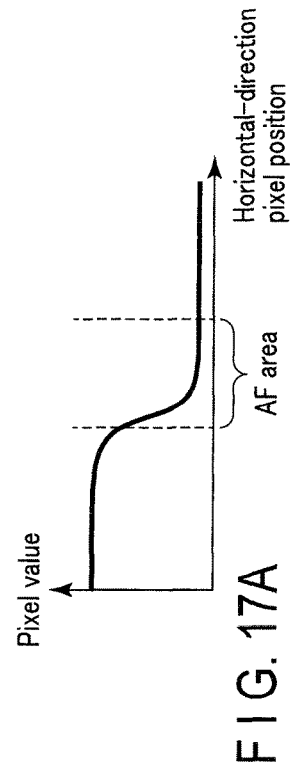
FIG. 17A is a chart showing one-dimensional image data in a defocusing lens position.
Figure 17B:
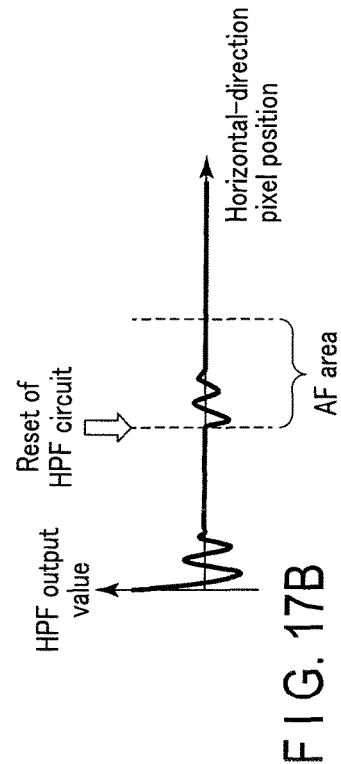
FIG. 17B is a chart showing data processed through an HPF in a defocusing lens position when the HPF circuit is reset on the boundary of the AF area.
Figure 16A:
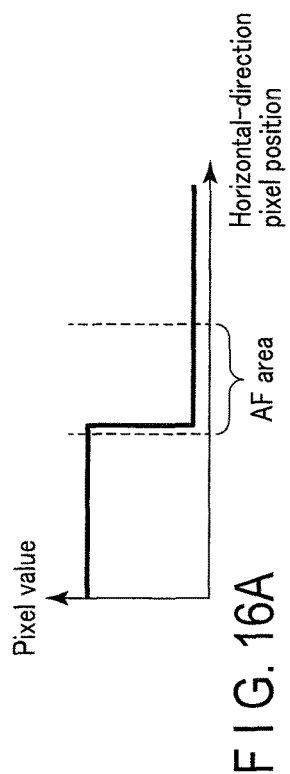
FIG. 16A is a chart showing one-dimensional image data in a focusing lens position.
Figure 16B:
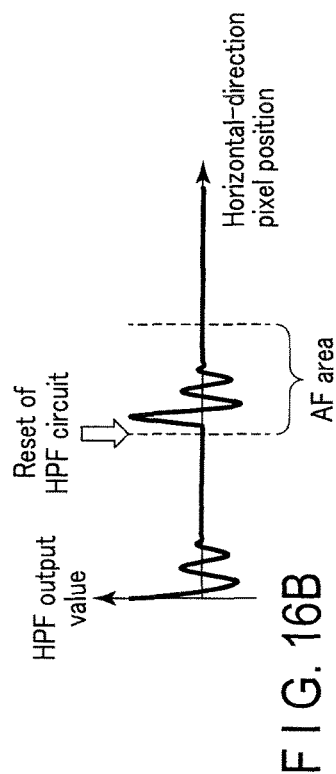
FIG. 16B is a chart showing data processed through an HPF in a focusing lens position when the HPF circuit is reset on the boundary of the AF area.

Consider another situation in which there is an edge in the AF area 84 and near the boundary of the AF area 84. Assuming here that a contrast curve is obtained as shown in FIG. 15, when an edge is present in the AF area 84, the image data is sharpened in the focusing lens position (point X) as shown in FIG. 16A, and a wide variation can be observed in data obtained by filtering the image data through the HPF as shown in FIG. 16B. In the defocusing lens position (point Y), the edge is blunted as shown in FIG. 17A and a variation in data processed through the HPF becomes small as shown in FIG. 17B. Therefore, a focusing position can be detected by observing a variation in AF evaluation value.

Figure 18A:
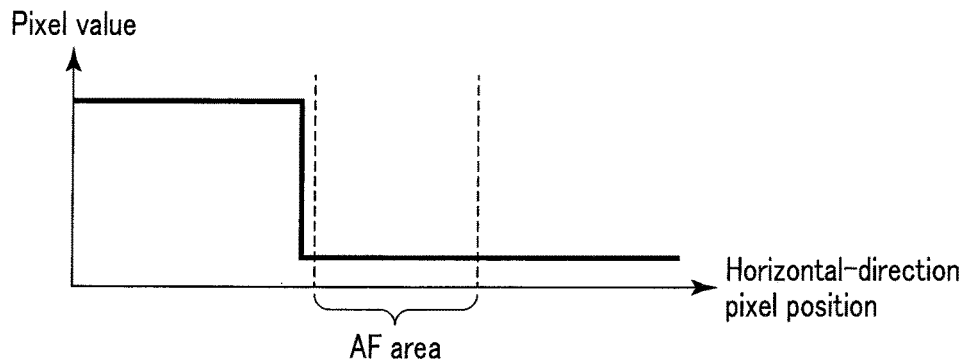
FIG. 18A is a chart showing one-dimensional image data when an edge moves slightly outside the AF area.
Figure 18B:
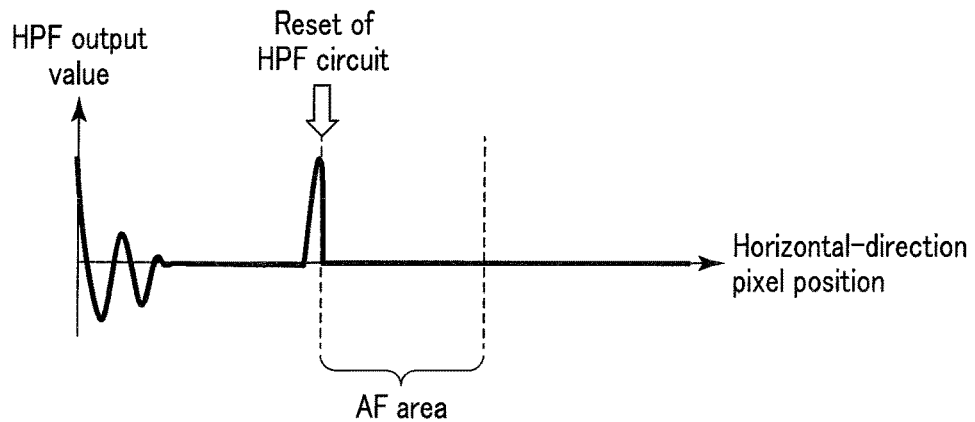
FIG. 18B is a chart showing data processed through an HPF when the HPF circuit is reset on the boundary of the AF area.
Figure 19:
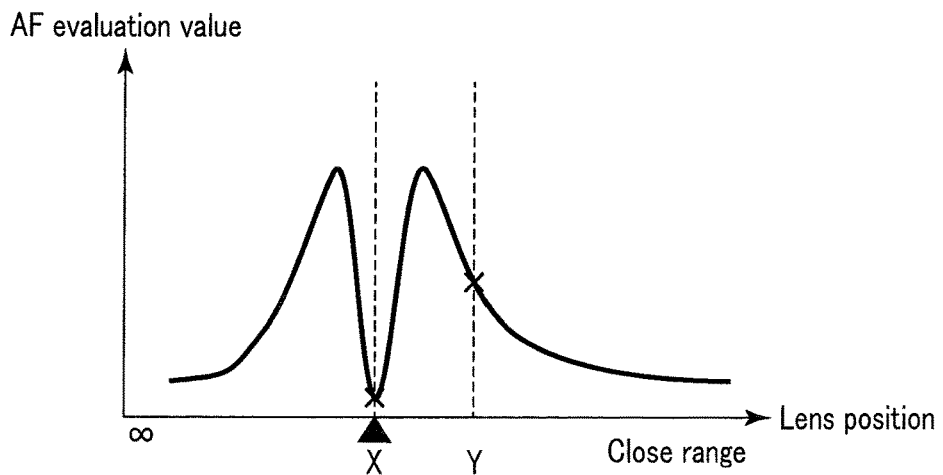
FIG. 19 is a chart showing a contrast curve when an edge moves slightly outside the AF area.

If, however, the HPF circuit 82 is reset on the boundary of the AF area 84 as described above, a problem arises when an edge move slightly outside the AF area 84, as shown in FIG. 18A, due to a camera shake or the like. In this case, the reset of the HPF circuit 82 brings about an advantage of preventing an AF signal from being generated within the AF area 84, as shown in FIG. 18B. In other words, the data processed through the HPF varies widely due to the edge, but an output signal becomes zero because the HPF circuit 82 is initialized on the boundary of the AF area 84. If this phenomenon occurs during a series of AF sequence operations, AF evaluation value data is not detected correctly. In other words, if the phenomenon occurs at point X of the contrast curve corresponding to a focusing position, the AF evaluation value data becomes zero as indicated by the contrast curve of FIG. 19 though it normally has a maximum value, with the result that a focusing position cannot be detected correctly.

In the first embodiment, the foregoing problem can be resolved by providing the filter processing circuit 72 with the coefficient generating circuit 78 and supplying the HPF circuit 82 with image data obtained by multiplying image data (brightness data) from the Y generating circuit 70 by coefficient K, as shown in FIG. 2. Coefficient K increases gradually to the boundary of the AF area 84 from the reset of the HPF circuit 82, as shown in FIG. 3.

FIGS. 20A to 20C are charts each showing the original image data, image data multiplied by a coefficient, and data processed through an HPF in the first embodiment. In these charts, the one-dot-one-dash line indicates image data from the Y generating circuit 70, the solid heavy line indicates image data multiplied by a coefficient, and the solid fine line indicates data processed through an HPF. FIG. 20A shows a case where an edge is within the AF area 84, FIG. 20B shows a case where an edge is slightly outside the AF area 84 due to a camera shake, and FIG. 20C shows a case where an edge is originally located at a position distant from the AF area 84.

First, the case of FIG. 20A in which an edge is within the AF area will be described. Since coefficient K is "0" until the HPF circuit 82 is reset as shown in FIG. 3, the image data multiplied by the coefficient is also zero. Coefficient K increases gradually from when the HPF circuit 82 is reset and accordingly the image data multiplied by the coefficient gradually gets close to the original image data. The original data is input to the HPF circuit 82 because coefficient K is "1" in the AF area 84. Thus, HPF-processed data that varies greatly due to an edge can be acquired and consequently AF evaluation value data to be acquired normally can be detected.

When an edge moves slightly outside the AF area 84 due to a camera shake as shown in FIG. 20B, the HPF circuit 82 is supplied with substantially the original image data as image data of an edge portion. Therefore, the HPF-processed data that is close to the case of FIG. 20A with respect to the edge can be acquired and consequently AF evaluation value data to be acquired normally can be detected.

In contrast, with respect to the edge obviously outside the AF area 84 as shown in FIG. 20C, the coefficient-multiplexed image data has a small image data value, and the HPF-processed data has a very small value. Since, therefore, only AF evaluation value having a very small value is obtained, a threshold value can appropriately be set to eliminate a threshold value. The contrast curve appearing at that time differs in shape from that shown in FIG. 15, and no influence is particularly exerted because a focusing position is determined by a relative variation in AF evaluation value data.

Figure 21:
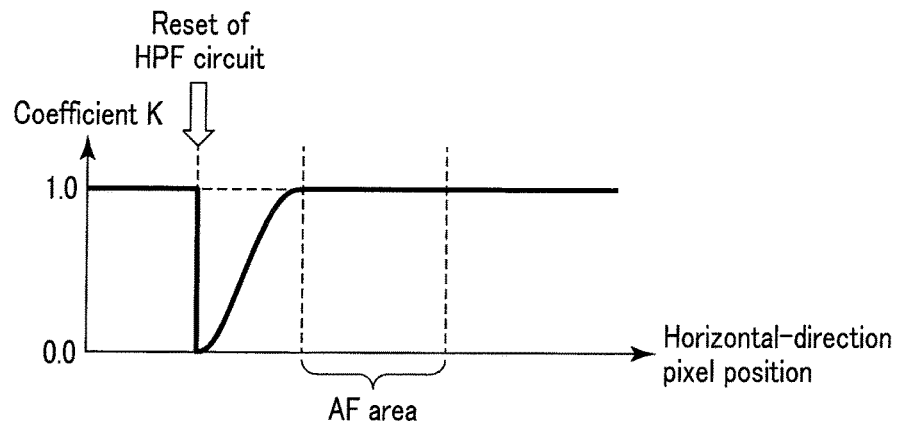
FIG. 21 is a chart showing another example of a coefficient generated by the coefficient generating circuit of the focus detection circuit.

Coefficient K generated by the coefficient generating circuit 78 need not be "0" until the HPF circuit 82 is reset as shown in FIG. 3, but it may be "1" until the HPF circuit 82 is reset as shown in FIG. 21. It does not matter whatever value is input before the HPF circuit 82 is reset.

In FIGS. 3 and 21, coefficient K need not be "0" completely but has only to be a very small value close to "0" when the HPF circuit 82 is reset.

As the width of a variation region of coefficient K (the width from the reset position to the AF area) increases, an object outside the AF area 84 has a great influence. Thus, the variation region width and variation state of coefficient K generated by the coefficient generating circuit 78 are set appropriately according to the status (aperture and focal length) of the taking lens 16, setting of a camera mode (a parameter designating the degree of influence outside the AF area 84), an object and the like.

When a camera shake has a great influence on an image plane such as when a telephoto lens is used, the variation region of coefficient K is increased. When the stabilization level of the image stabilizing unit is high, the variation region of coefficient K is decreased to reduce an influence of mixture of near and far objects. An amount of camera shake can be detected by a gyroscope to increase the width of the variation region of coefficient K when the shake is large and decrease it when the shake is small. Or a motion vector can be detected to increase the width of the variation region of coefficient K when the motion of an object is large and decrease it when the motion is small.

Figure 22:
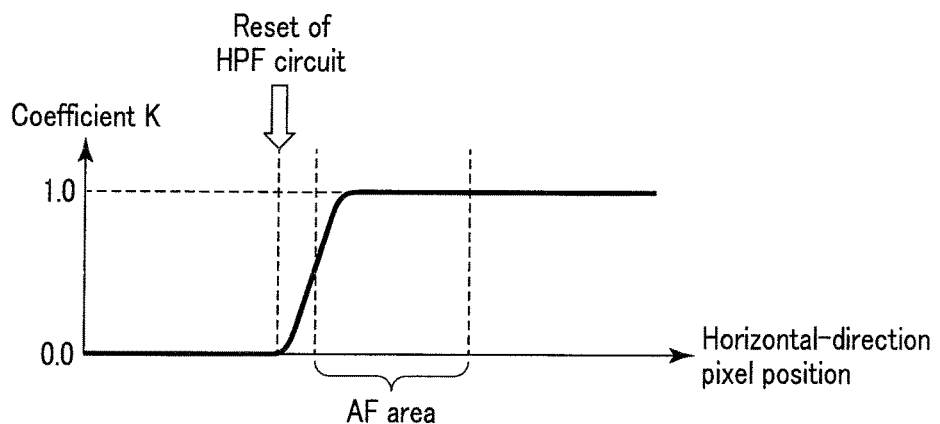
FIG. 22 is a chart showing another example of a coefficient generated by the coefficient generating circuit of the focus detection circuit.
Figure 23:
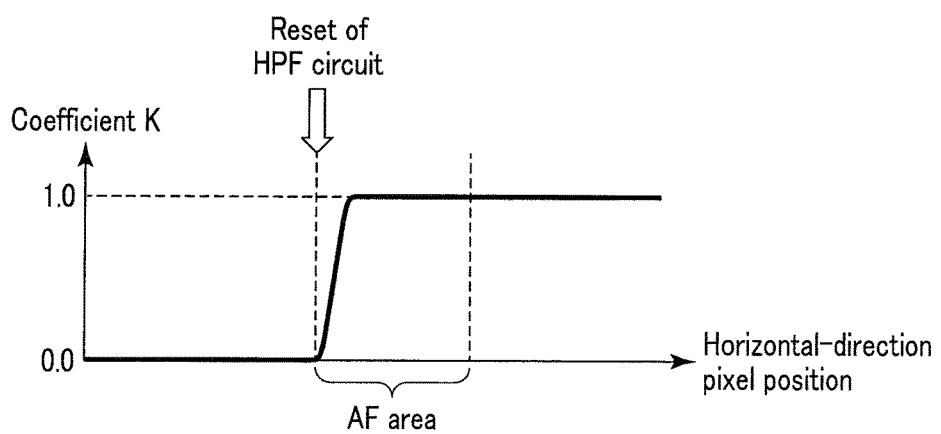
FIG. 23 is a chart showing another example of a coefficient generated by the coefficient generating circuit of the focus detection circuit.

Furthermore, as shown in FIGS. 22 and 23, the reset position of the HPF circuit 82, the width of the variation region of coefficient K and the boundary position of the AF area 84 can be varied.

For example, when the AF area 84 is displayed on the EVF 54, a photographer cannot imagine that an automatic focusing is influenced by a high-contrast object outside the AF area 84. In this case, if the reset position of the HPF circuit 82 is adjusted to the boundary of the AF area 84 as shown in FIG. 23, automatic focusing can reliably be performed in response to only the object within the AF area 84.

As described above, the reset position of the HPF circuit 82 and the variation characteristics of coefficient K can be adjusted to the optimum states corresponding to a camera shake in association with the amount of camera shake and the image stabilizing operation. Thus, a contrast curve as shown in FIG. 15 can be detected accurately for the object within the AF area 84, and the object can be focused.

Varying coefficient K smoothly as shown in FIG. 3 increases circuit scale and processing time.

To prevent the circuit scale and processing time from increasing, coefficient K can be varied like a polygonal line as shown in FIG. 24 and varied stepwise as shown in FIG. 25. If coefficient K is varied like a polygonal line and stepwise, a slight variation appears on the HPF-processed data, but the variation is very small and thus does not have a great influence on focus detection.

As described above, the focus detection circuit 68 corresponding to the focus detection apparatus according to the first embodiment generates a focus evaluation value (AF evaluation value data) based on image data corresponding to a predetermined focus detection area (AF area 84), and includes the HPF circuit 82 serving as a filter circuit which filters image data to be input, the reset circuit 76 which generates a reset signal to reset the HPF circuit 82, the multiplier 80 serving as a multiplication circuit which multiplies the image data by a predetermined coefficient and supplies the HPF circuit 82 with the image data multiplied by the coefficient as image data to be filtered after the reset circuit 76 generates the reset signal, the coefficient generating circuit 78 which generates the coefficient, and the area integration circuit 74 serving as an integration circuit which generates AF evaluation value data within the AF area 84 based on an output of the HPF circuit 82. If, therefore, the HPF circuit 82 is reset and then the original image data multiplied by the predetermined coefficient is supplied to the HPF circuit 82, a focusing position can be detected even though the high-contrast object 86 is included in or excluded from the AF area 84.

The coefficient generating circuit 78 increases the coefficient gradually from when the reset circuit 76 generates the reset signal. Or the coefficient generating circuit 78 increases the coefficient like a polygonal line or stepwise from when the reset circuit 76 generates the reset signal. Accordingly, even though an edge slightly moves outside the AF area 84, substantially the original data is input to the HPF circuit 82 as image data of an edge portion. Thus, substantially the original HPF-processed data is acquired for the edge and consequently AF evaluation value data to be originally acquired can be detected.

During a period to vary the coefficient K, the coefficient generating circuit 78 makes the amount of variation in the coefficient generated immediately after the reset circuit 76 generates the reset signal smaller than the amount of variation in the coefficient generated during a period subsequent thereto. Thus, the change frequency of image data multiplied by the coefficient can be lowered and cut by the HPF process of the HPF circuit 82, with the result that the HPF-processed data can be prevented from being influenced by the coefficient multiplication.

The coefficient generating circuit 78 also varies the coefficient from when the reset circuit 76 generates the reset signal at least until image data corresponding to the AF area is input. Accordingly, even though an edge slightly moves outside the AF area 84, substantially the original data is input to the HPF circuit 82 as image data of an edge portion. Thus, substantially the original HPF-processed data is acquired for the edge and consequently AF evaluation value data to be originally acquired can be detected.

The coefficient generating circuit 78 may vary the coefficient even after image data corresponding to the AF area 84 is input. In this case, too, AF evaluation value data to be originally acquired can be detected when an edge slightly moves in and from the AF area 84.

It is desirable that the coefficient generating circuit 78 make the amount of variation in the coefficient immediately after the start of the variation and the amount of variation in the coefficient immediately before the end of the variation smaller than the amount of variation in the coefficient during a period therebetween. Thus, the change frequency of image data multiplied by a coefficient can be lowered and cut by the HPF process of the HPF circuit 82, with the result that the HPF-processed data can be prevented from being influenced by the coefficient multiplication.

The coefficient varies from "0" to "1." Accordingly, the value of the original input image data can be reserved toward the AF area 84, and AF evaluation value data to be originally acquired can be detected.

The reset circuit 76 may change a period from when it generates the reset signal until image data corresponding to the AF area 84 is input in accordance with a camera shake state during focus detection. Thus, an influence of a camera shake can be reduced.

When the focus detection circuit 68 is mounted on the camera 10 as optical equipment, including the taking lens 16 and the image pickup device to pick up an optical image of an object through the taking lens 16 to generate image data, the reset circuit 76 may change a period from when it generates the reset signal until image data corresponding to the AF area 84 is input in accordance with the optical conditions of the taking lens 16. Thus, an influence of the optical conditions of the taking lens 16 can be reduced.

Second Embodiment

A second embodiment of the present invention will be described below.

In most cases, as shown in FIG. 26, a plurality of AF areas, e.g. 5×5 AF areas (multipoint AF area 88) are arranged at once within the image plane of the camera 10. To apply the focus detection apparatus of the present invention to the camera 10 including the multipoint AF area 88, it is necessary to start to input a signal to the HPF circuit for an AF area during the integration of AF evaluation value data of another AF area. A focus detection circuit 68 corresponding to the focus detection apparatus of the second embodiment is configured as shown in FIG. 27 such that it can be adapted to the multipoint AF area 88. Specifically, the focus detection circuit 68 includes a plurality of filter processing circuits, or N filter processing circuits [1] to [N] 72-1 to 72-N, a multipoint area integration circuit 90 and a multipoint area controller 92 in place of the filter processing circuit 72, area integration circuit 74 and reset circuit 76 of the first embodiment.

The filter processing circuits [1] to [N] 72-1 to 72-N each have a configuration similar to that of the filter processing circuit 72 of the first embodiment. In other words, the filter processing circuits [1] to [N] 72-1 to 72-N each have a coefficient generating circuit 78, a multiplier 80 and an HPF circuit 82. The filter processing circuits [1] to [N] 72-1 to 72-N outputs HPF output data [1] to [N], and the HPF output data [1] to [N] are input to the multipoint area integration circuit 90.

The multipoint area integration circuit 90 selectively integrates the input HPF output data [1] to [N] to generate AF evaluation value data for each AF area.

The multipoint area controller 92 supplies a reset signal to each of the filter processing circuits [1] to [N] 72-1 to 72-N to control the reset timing of the filter processing circuits [1] to [N] 72-1 to 72-N. The multipoint area controller 92 also supplies the multipoint area integration circuit 90 with a selector signal to select the HPF output data [1] to [N] integrated by the multipoint area integration circuit 90.

The focus detection circuit 68 includes three filter processing circuits [1] to [3] 72-1 to 72-3 when the multipoint AF area 88 includes 5×5 AF areas as shown in FIG. 26. The three filter processing circuits [1] to [3] 72-1 to 72-3 use coefficient K that varies in the same manner as shown in FIG. 2 of the first embodiment. In this case, however, the three filter processing circuits [1] to [3] 72-1 to 72-3 use coefficients K1 to K3 as shown in FIG. 28 by shifting the reset timings of the reset signals from one another by the multipoint area controller 92. The image data (brightness data) from the Y generating circuit 70 are input at once to the three filter processing circuits [1] to [3] 72-1 to 72-3, and the image data in the horizontal-direction pixel position which varies among the filter processing circuits [1] to [3] 72-1 to 72-3 is filtered through an HPF by shifting the reset timings. The multipoint area controller 92 supplies a selector signal to the multipoint area integration circuit 90 with timing corresponding to the AF area in each column and thus the multipoint area integration circuit 90 can integrate the HPF output data corresponding to the AF area in each column and output AF evaluation value data. The multipoint area integration circuit 90 is supplied with HPF output data [1] about the AF areas in columns A and D in the multipoint AF area 88, HPF output data [2] about the AF areas in columns B and E therein, and HPF output data [3] about the AF area in column C therein.

As described above, the focus detection circuit 68 corresponding to the focus detection apparatus of the second embodiment includes a plurality of HPF circuits 82, a plurality of multipliers 80 and a plurality of coefficient generating circuits 78, and the multipoint area integration circuit 90 selectively integrates the outputs from the HPF circuits 82 as an integration circuit. Therefore, in the camera 10 with the multipoint AF area 88, too, a focus position can be detected even though a high contrast object moves in and outside the multipoint AF area 88.

The present invention has been described so far based on the above first and second embodiments. The present invention is not limited to the embodiments but various modifications and applications can be made within the scope of the subject matter of the present invention.

In the first and second embodiments, a camera as optical equipment to which the focus detection apparatus of the present invention is applied, has been described as an example of the present invention. The focus detection apparatus of the present invention can also be applied to other optical equipment such as binoculars. It can also be applied to equipment such as using an auto focus function of a contrast AF system.

Furthermore, the focus detection apparatus can be applied to a mobile device that is influenced by a camera shake, such as a smartphone, a wearable device and an industrial endoscope.

The configuration of the present invention can be used for not only AF but also sensing of image characteristics such as tracking and recognition of an object.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A focus detection apparatus which generates a focus evaluation value based on image data corresponding to a predetermined focus detection area, comprising:
a filter circuit which filters image data to be input;
a reset circuit which generates a reset signal to reset the filter circuit;
a multiplication circuit which multiplies the image data by a predetermined coefficient and supplies the filter circuit with the image data multiplied by the coefficient as image data to be filtered after the reset circuit generates the reset signal;
a coefficient generating circuit which generates the coefficient; and
an integration circuit which generates the focus evaluation value within the focus detection area based on an output of the filter circuit.

2. The apparatus according to claim 1, wherein
the coefficient generating circuit increases the coefficient gradually from when the reset circuit generates the reset signal.

3. The apparatus according to claim 2, wherein
during a period to vary the coefficient, the coefficient generating circuit makes an amount of variation in the coefficient generated immediately after the reset circuit generates the reset signal smaller than an amount of variation in the coefficient generated during a period subsequent thereto.

4. The apparatus according to claim 1, wherein
the coefficient generating circuit performs one of a process of increasing the coefficient like a polygonal line and a process of increasing the coefficient stepwise from when the reset circuit generates the reset signal.

5. The apparatus according to claim 4, wherein
during a period to vary the coefficient, the coefficient generating circuit makes an amount of variation in the coefficient generated immediately after the reset circuit generates the reset signal smaller than an amount of variation in the coefficient generated during a period subsequent thereto.

6. The apparatus according to claim 1, wherein
the coefficient generating circuit varies the coefficient from when the reset circuit generates the reset signal at least until image data corresponding to the focus detection area is input.

7. The apparatus according to claim 6, wherein
during a period to vary the coefficient, the coefficient generating circuit makes an amount of variation in the coefficient immediately after start of the variation and an amount of variation in the coefficient immediately before end of the variation smaller than an amount of variation in the coefficient during a period therebetween.

8. The apparatus according to claim 6, wherein
the coefficient generating circuit varies the coefficient even after image data corresponding to the focus detection area is input.

9. The apparatus according to claim 8, wherein
during a period to vary the coefficient, the coefficient generating circuit makes an amount of variation in the coefficient immediately after start of the variation and an amount of variation in the coefficient immediately before end of the variation smaller than an amount of variation in the coefficient during a period therebetween.

10. The apparatus according to claim 1, wherein
the reset circuit changes a period from when it generates the reset signal until image data corresponding to the focus detection area is input in accordance with a camera shake state during focus detection.

11. The apparatus according to claim 1, wherein
the apparatus is mounted on optical equipment including a taking lens and an image pickup device to pick up an optical image of an object through the taking lens to generate image data, and the reset circuit changes a period from when it generates the reset signal until image data corresponding to the focus detection area is input in accordance with optical conditions of the taking lens.

12. The apparatus according to claim 1, wherein
the apparatus includes a plurality of the filter circuits, a plurality of multiplication circuits and a plurality of coefficient generating circuits, and
the integration circuit selectively integrate outputs from the filter circuits.

13. A focus detection method of generating a focus evaluation value based on image data corresponding to a predetermined focus detection area, comprising:
generating a reset signal to reset a filter circuit which filters image data to be input;
generating a predetermined coefficient after the reset signal is generated;
multiplying the image data by the coefficient and supplying the filter circuit with the image data multiplied by the coefficient as image data to be filtered after the reset signal is generated; and
generating the focus evaluation value within the focus detection area based on an output of the filter circuit.

* * * * *